US010565190B2

(12) United States Patent
Hanai et al.

(10) Patent No.: US 10,565,190 B2
(45) Date of Patent: Feb. 18, 2020

(54) INDEX TREE SEARCH METHOD AND COMPUTER

(71) Applicant: Hitachi, Ltd., Tokyo (JP)

(72) Inventors: Tomohiro Hanai, Tokyo (JP); Kazutomo Ushijima, Tokyo (JP); Tsuyoshi Tanaka, Tokyo (JP); Hideo Aoki, Tokyo (JP); Atsushi Tomoda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 631 days.

(21) Appl. No.: 14/911,137

(22) PCT Filed: Oct. 29, 2014

(86) PCT No.: PCT/JP2014/078758
§ 371 (c)(1),
(2) Date: Feb. 9, 2016

(87) PCT Pub. No.: WO2015/136765
PCT Pub. Date: Sep. 17, 2015

(65) Prior Publication Data
US 2016/0203180 A1 Jul. 14, 2016

(30) Foreign Application Priority Data

Mar. 10, 2014 (JP) .................................. 2014-045946

(51) Int. Cl.
*G06F 16/00* (2019.01)
*G06F 16/245* (2019.01)
(Continued)

(52) U.S. Cl.
CPC .......... *G06F 16/245* (2019.01); *G06F 9/3009* (2013.01); *G06F 9/30043* (2013.01); *G06F 9/355* (2013.01); *G06F 16/2246* (2019.01)

(58) Field of Classification Search
CPC ............... G06F 17/30; G06F 17/30094; G06F 17/30327; G06F 17/30424; G06F 12/00;
(Continued)

(56) References Cited

U.S. PATENT DOCUMENTS 6,105,018 A * 8/2000 Demers ................... G06F 16/22
6,205,519 B1 * 3/2001 Aglietti ............... G06F 12/0842
711/126
(Continued)

FOREIGN PATENT DOCUMENTS

JP 07-248949 A 9/1995
JP 2006-228060 A 8/2006
(Continued)

OTHER PUBLICATIONS

International Search Report of PCT/JP2014/078758.
(Continued)

*Primary Examiner* — Hanh B Thai
(74) *Attorney, Agent, or Firm* — Mattingly & Malur, PC

(57) ABSTRACT

An index tree search method, by a computer, for searching an index tree included in a database provided by the computer which includes processors executing a plurality of threads and a memory, the index tree search method comprising: a first step of allocating, by the computer, search ranges in the index tree to the plurality of threads; a second step of receiving, by the computer, a search key; a third step of selecting, by the computer, a thread corresponding to the received search key; and a fourth step of searching, by the computer, the index tree with the selected thread using the received search key.

20 Claims, 14 Drawing Sheets

(51) Int. Cl.
*G06F 9/30* (2018.01)
*G06F 9/355* (2018.01)
*G06F 16/22* (2019.01)

(58) Field of Classification Search
CPC ............ G06F 16/245; G06F 16/2246; G06F 16/2343; G06F 16/2455; G06F 9/30043; G06F 9/3009; G06F 9/355
USPC ........................................................ 707/758
See application file for complete search history.

(56) References Cited

U.S. PATENT DOCUMENTS

| | | | | |
|---|---|---|---|---|
| 8,495,044 | B2* | 7/2013 | Buban | G06F 16/1774 707/704 |
| 8,566,828 | B2* | 10/2013 | Pilkington | G06F 9/526 718/102 |
| 2005/0166206 | A1* | 7/2005 | Parson | G06F 9/526 718/104 |
| 2007/0106640 | A1* | 5/2007 | Shankara | H04L 45/7453 |
| 2008/0228790 | A1* | 9/2008 | Smith | G06F 16/289 |
| 2009/0327372 | A1* | 12/2009 | Ylonen | G06F 12/0253 |
| 2010/0023480 | A1* | 1/2010 | Ito | G06F 17/30321 707/E17.002 |
| 2010/0082664 | A1* | 4/2010 | Odaira | G06F 17/30327 707/769 |
| 2010/0312995 | A1* | 12/2010 | Sung | G06N 3/006 712/220 |
| 2011/0213775 | A1* | 9/2011 | Franke | G06F 17/30584 707/737 |
| 2012/0117067 | A1* | 5/2012 | Yakubovich | G06F 17/30327 707/737 |

FOREIGN PATENT DOCUMENTS

| | | |
|---|---|---|
| JP | 2007-323153 A | 12/2007 |
| JP | 2008-046700 A | 2/2008 |

OTHER PUBLICATIONS

PLP: Page Latch-free Shared-Everything OLTP (Proceedings of the VLDB Endowment, Jul. 2011, vol. 4, Issue: 10.
Tomohiro Yoshihara et al. "Influence of Load-Balancing Operations on Parallel Btree Concurrency Control", IEICE Technical Report, Jul. 6, 2005, vol. 105, No. 171, pp. 185-190.
Haruo Yokota et al. "Fat-Btree: An Update-Conscious Parallel Directory Structure", IEEE, Mar. 23, 1999.
Jun Miyazaki et al., "An Implementation and Evaluation of Fat-Btrees" Technical Report of IEICE, Jul. 23, 1999, vol. 99, No. 203, pp. 93-98.

* cited by examiner

124 THREAD ALLOCATING TABLE

| THREAD | SEARCH RANGE | | PRIORITY |
| --- | --- | --- | --- |
| | LEFT END | RIGHT END | |
| T1 | * | F | Off |
| T2 | F | L | Off |
| T3 | L | R | On |
| T4 | R | * | Off |

800 EXCLUSIVITY DECISION TABLE

| | | PRECEDING THREAD 801 | | |
| --- | --- | --- | --- | --- |
| | 806 | NO EXCLUSIVITY 802 | REFERENCE EXCLUSIVITY 803 | UPDATE EXCLUSIVITY 804 |
| SUCCEED-ING THREAD | REFERENCE EXCLUSIVITY | CAN OBTAIN IMMEDIATELY | CAN OBTAIN IMMEDIATELY | WAIT FOR RESETTING EXCLUSIVITY |
| 805 | UPDATE EXCLUSIVITY 807 | CAN OBTAIN IMMEDIATELY | WAIT FOR RESETTING EXCLUSIVITY | WAIT FOR RESETTING EXCLUSIVITY |

FIG. 8

126 LOAD BALANCING PARAMETER TABLE

| PARAMETER NAME | SET VALUE | |
|---|---|---|
| IMBALANCE DETECTING THRESHOLD | $T_H$ | 1101 |
| LOW LOAD DETERMINATION THRESHOLD | $T_L$ | 1102 |

127 THREAD-CORE CORRESPONDENCE TABLE

| THREAD ID (1301) | PROCESSOR ID (1302) | CPU CORE ID (1303) |
|---|---|---|
| T1 | P1 | C1 |
| T2 | P1 | C2 |
| T3 | P2 | C1 |
| T4 | P2 | C2 |

FIG. 13

1400 TRANSFER DIRECTION ASSOCIATION TABLE

| | | LOAD OF LEFT THREAD (1401) | | |
|---|---|---|---|---|
| | | $<T_L$ | $T_L \sim T_H$ | $>T_H$ |
| LOAD OF RIGHT THREAD | $<T_L$ | (b) TAKE INTO ACCOUNT ALLOCATION ON MEMORY | TRANSFER RIGHTWARD | TRANSFER RIGHTWARD |
| | $T_L \sim T_H$ | TRANSFER LEFTWARD | (b) TAKE INTO ACCOUNT ALLOCATION ON MEMORY | TRANSFER RIGHTWARD |
| | $>T_H$ | TRANSFER LEFTWARD | TRANSFER LEFTWARD | DO NOT TRANSFER |

1410 TRANSFER DIRECTION DETERMINATION TABLE

| | | PROCESSOR ID OF RIGHT THREAD (1403) | |
|---|---|---|---|
| | | SAME AS SOURCE THREAD | DIFFER FROM SOURCE THREAD |
| PROCESSOR ID OF LEFT THREAD | SAME AS SOURCE THREAD | LOWER LOAD THREAD OF LEFT AND RIGHT THREADS | TRANSFER LEFTWARD |
| | DIFFER FROM SOURCE THREAD | TRANSFER RIGHTWARD | LOWER LOAD THREAD OF LEFT AND RIGHT THREADS |

130 THREAD LOAD RECORDING TABLE

| THREAD | THE NUMBER OF TIMES OF INDEX CONTROL | COUNT STARTING TIME |
|---|---|---|
| T1 | 100 | 2013/12/01 12:34:56 |
| T2 | 150 | 2013/12/01 12:34:56 |
| T3 | 50 | 2013/12/01 12:34:56 |
| T4 | 100 | 2013/12/01 12:34:56 |

*FIG. 17*

INDEX TREE SEARCH METHOD AND COMPUTER

CLAIM OF PRIORITY

The present application claims priority from Japanese patent application JP2014-045946 filed on Mar. 10, 2014, the content of which is hereby incorporated by reference into this application.

BACKGROUND

The present invention relates to handling of an index access in a database management system.

The technological progress in the computer hardware in recent years allows a computer to implement a multicore CPU including lots of CPU cores and large capacity memory. As a result, an in-memory database that stores and processes data on memory is becoming common as a database management system (DBMS). A conventional DBMS (disk DB) that stores data in a permanent storage medium (such as HDD and SSD) causes a bottleneck in performance in the input/output from/to the storage medium. On the other hand, because multiple threads executed on multiple CPU cores process data simultaneously on memory in the in-memory database, a conflict in the exclusive control between the threads causes a bottle neck. Thus, it is necessary to minimize exclusive conflicts between threads and allow lots of threads to perform database processing in parallel for improving the performance of a database management system.

Index access processing is processing apt to cause an exclusive conflict in a conventional database processing. Because lots of threads access the same data structure in parallel in the index access processing, the exclusive control for the data structure is required and simultaneous executing performance between the threads is degraded. When complex exclusive control processing is executed to avoid conflicts in the exclusive control and to improve the simultaneous access processing, the exclusive control processing becomes an overhead and causes a bottleneck in performance.

For the above-mentioned problem, Patent Literature 1 describes a technique of reducing the exclusive control, in searching an index tree, by determining that an intermediate node meeting search criteria and the higher-level nodes are exclusive control targets and by not executing the exclusive control to the lower-level nodes of the inter mediate node.

Non-patent Literature 1 describes a technique that an index tree is divided on a thread basis and each of the divided index subtrees is accessed by only one thread.

PRIOR ART

Patent Literature 1: JP 2007-323153 A
Non-patent Literature 1: PLP: page latch-free shared-everything OLTP (Proceedings of the VLDB Endowment, Volume 4 Issue 10, July 2011)

SUMMARY

However, in the technique of Patent Literature 1, a conflict in the exclusive control occurs when a search range overlap with other search range, because the exclusive control to the intermediate node and the lower-lever nodes is executed collectively and the granularity of the exclusive control is large.

The technique of Non-patent Literature 1 enables exclusive control in index access processing not to be needed. But a problem that a throughput of the whole system is reduced occurs when an imbalance in loads of threads occurs. Data transfer between the index subtrees needs executing to balance the loads and solve the imbalance. When the data transfer executes, a problem that exclusive control between the index subtrees needs executing occurs, and a problem that loads of processing is large due to changes of a data structure.

The problems of the above back ground arts is coping with both to balance the loads with the small amount of processing when the imbalance in the loads occurs and to minimize conflicts in the exclusive processing and the exclusive control.

The present invention is an index tree search method, by a computer, for searching an index tree included in a database provided by the computer which includes processors executing a plurality of threads and a memory, the index tree search method comprising: a first step of allocating, by the computer, search ranges in the index tree to the plurality of threads; a second step of receiving, by the computer, a search key; a third step of selecting, by the computer, a thread corresponding to the received search key; and a fourth step of searching, by the computer, the index tree with the selected thread using the received search key.

Thus the present invention can reduce the number of times of executing the exclusive control by executing the exclusive control to only nodes which are accessible by a plurality of threads at the same time and by not executing the exclusive control to nodes which are not accessible by a plurality of threads at the same time. The number of threads accessing to nodes requiring the exclusive control is reduced by search ranges allocation to threads, therefore a frequency of conflict in the exclusive control can be reduced. Further, the load balancing can be executed without changing the index tree structure by changing the allocation of the search ranges when the imbalance in loads between the threads. By the above effects, index access speed in database processing can be improved.

BRIEF DESCRIPTIONS OF DRAWINGS

FIG. 8 is an exclusivity decision table depicting the embodiment of the present invention and used in exclusive obtaining processing in entry search processing.

FIG. 13 is an example of the thread-core association table depicting the embodiment of the present invention.

FIG. 14A is an example of a transfer direction determination table depicting the embodiment of the present invention used in determining load destination thread.

FIG. 14B is an example of a transfer direction determination table depicting the embodiment of the present invention used in determining load destination thread.

FIG. 17 is a diagram depicting the embodiment of the present invention and an example of a thread load recording table.

DETAILED DESCRIPTIONS OF EMBODIMENTS

Figure 1:
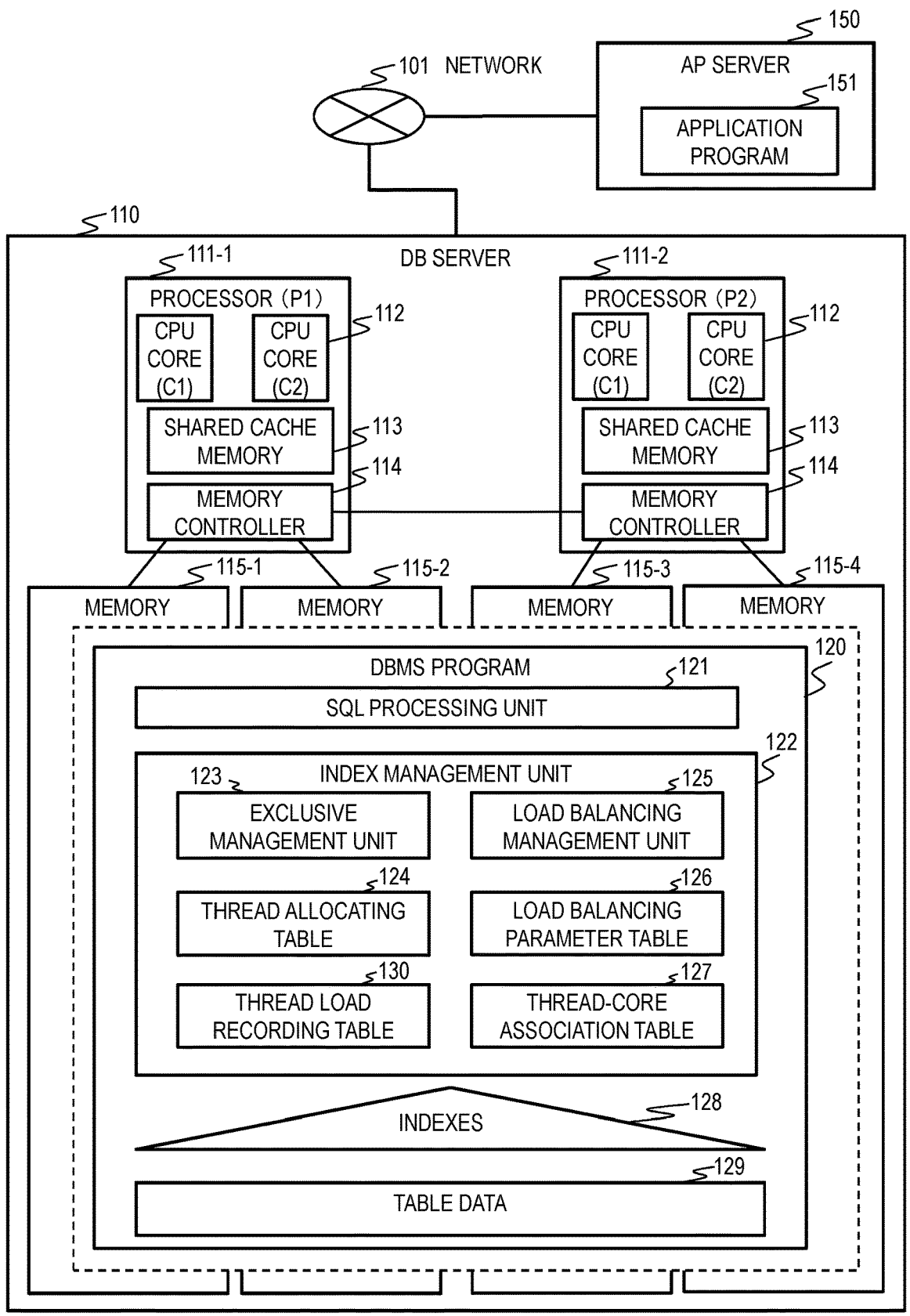
FIG. 1 is a block diagram depicting an embodiment of the present invention and an example of a configuration of a computer system.

Embodiments of the present invention are explained below based on the attached figures. FIG. 1 is a block diagram depicting an embodiment of the present invention and a configuration example of a computer system to which the present invention is applied.

In FIG. 1, a network 101 is connected with a DB server 110 running a database management system (DBMS) and with an AP server 150 running an application program (hereinafter referred to as the AP) 151.

Details of the hardware configuration of the AP server 150 are omitted. The application program 151 is running in the AP server 150. The application program 151 performs an application process, which issues a database processing request to the DB server 110 and receives the result of processing the request. The database processing request is generally described in SQL (Structured Query Language).

The DB server 110 includes a plurality of processors 111-1(P1), 111-2(P2) and a plurality of memories 115-1 to 115-4. A reference numeral 111 is the generic reference numeral of the processors and a reference numeral 115 is the generic reference numeral of the memories.

The processor 111 includes a plurality of CPU cores 112 (or a plurality of processor cores), a shared cache memory 113 accessed by the plurality of CPU cores 112(C1, C2), and a memory controller 114 controlling accesses to the memory 115.

Figures 5, 6:
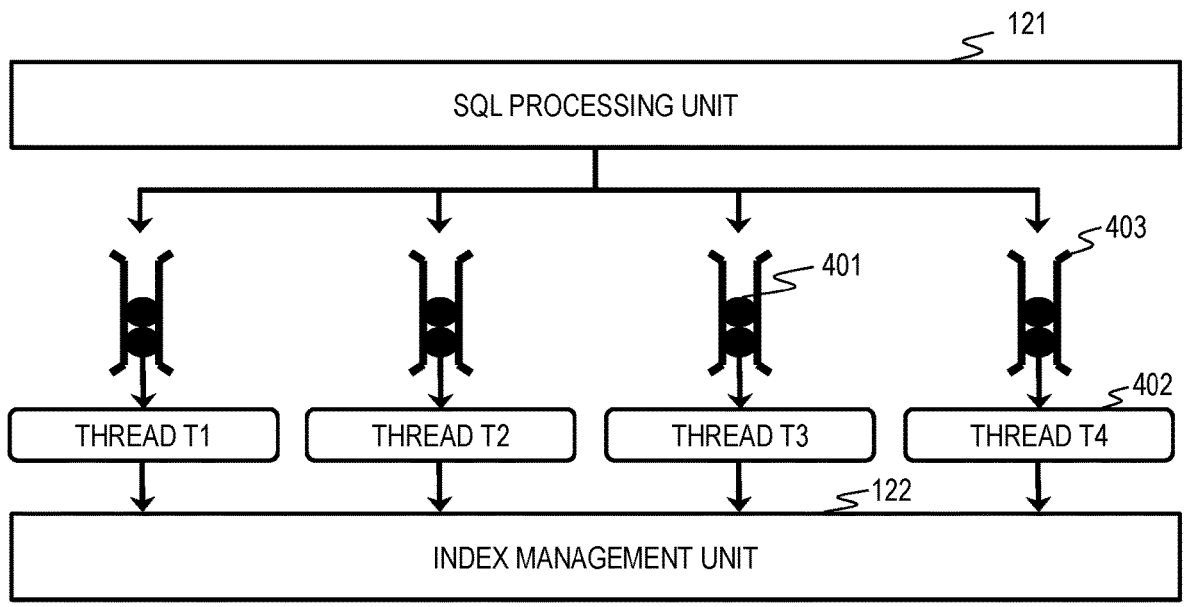
FIG. 5 is a block diagram depicting the embodiment of the present invention and an overview of processing by a SQL processing unit and an index management unit.
FIG. 6 is a diagram depicting the embodiment of the present invention and an example of a thread allocating table.

The CPU core 112 executes after-mentioned threads 402 (refer to FIG. 5). The thread 402 is a processing unit issued by the DBMS program 120 for each of the CPU cores 112. The processor 111 is connected with the memory 115 through the memory controller 114 having 2 channels. When a CPU core 112 included in a processor 111 accesses to a memory 115 connected with another processor 111, the CPU core 112 executes a memory access by transferring data between the memory controllers 114.

Since this processing is executed transparently by the memory controllers 114, when the CPU core 112 executes processing, the CPU core 112 need not distinguish which processor 111 is connected with the access destination memory 115.

However, there is a difference in access speed (or latency) between a case of accessing to a memory 115 connected with the same processor 111 and a case of accessing to a memory 115 connected with another processor 111. The access speed in the latter case is lower.

The database management system (DBMS) program 120 is loaded into the memory 115 and is executed by the processor 111. The DBMS program 120 includes a SQL processing unit (request processing unit) 121 receiving a database processing request from the application program 151 and controlling table data 129 based on the database processing request (SQL), an index management unit 122 executing processing regarding indexes 128, table data 129, which is control target data, and the index 128 which is an index corresponding to table data 129.

The index management unit 122 includes an exclusive management unit 123 executing an exclusive control, a thread allocating table 124 storing search ranges of threads, a load balancing management unit 125 executing load balancing processing among threads, a load balancing parameter table 126 storing parameters used in load balancing processing, and a thread-core association table 127 storing information about processors and CPU cores executing threads. The exclusive management unit 123 includes an exclusivity decision table 800 depicted in FIG. 8.

A variety of processing executed by threads is explained in this embodiment, the processing may be achieved by a plurality of processes and a memory shared by the plurality of processes but not limited to threads. In this case, a process can be a processing unit issued by the DBMS program 120 for each of the CPU cores 112.

Each functional unit included in the SQL processing unit 121 or the index management unit 122 in the DBMS program 120 is loaded into the memory 115 as a program.

Each CPU core 112 included in the processor 111 works as a functional unit providing predetermined function by executing processing according to a program of each functional unit. For example, the CPU core 112 performs as the SQL processing unit 121 by executing processing according to the SQL processing program. The same applies to the other programs. Further, the CPU core 112 also works as a functional unit providing each function of a plurality of processes executed by programs. Computers and computer systems are apparatuses and systems including these functional units.

The information of programs, tables, and the like realizing each of the functions of DBMS program 120 can be stored in memory devices, such as a storage subsystem (not depicted in the block diagram), a hard disk drive, and a SSD (Solid State Drive), or a non-transitory computer-readable medium, such as an IC card, a SD card, and a DVD.

Figure 2:
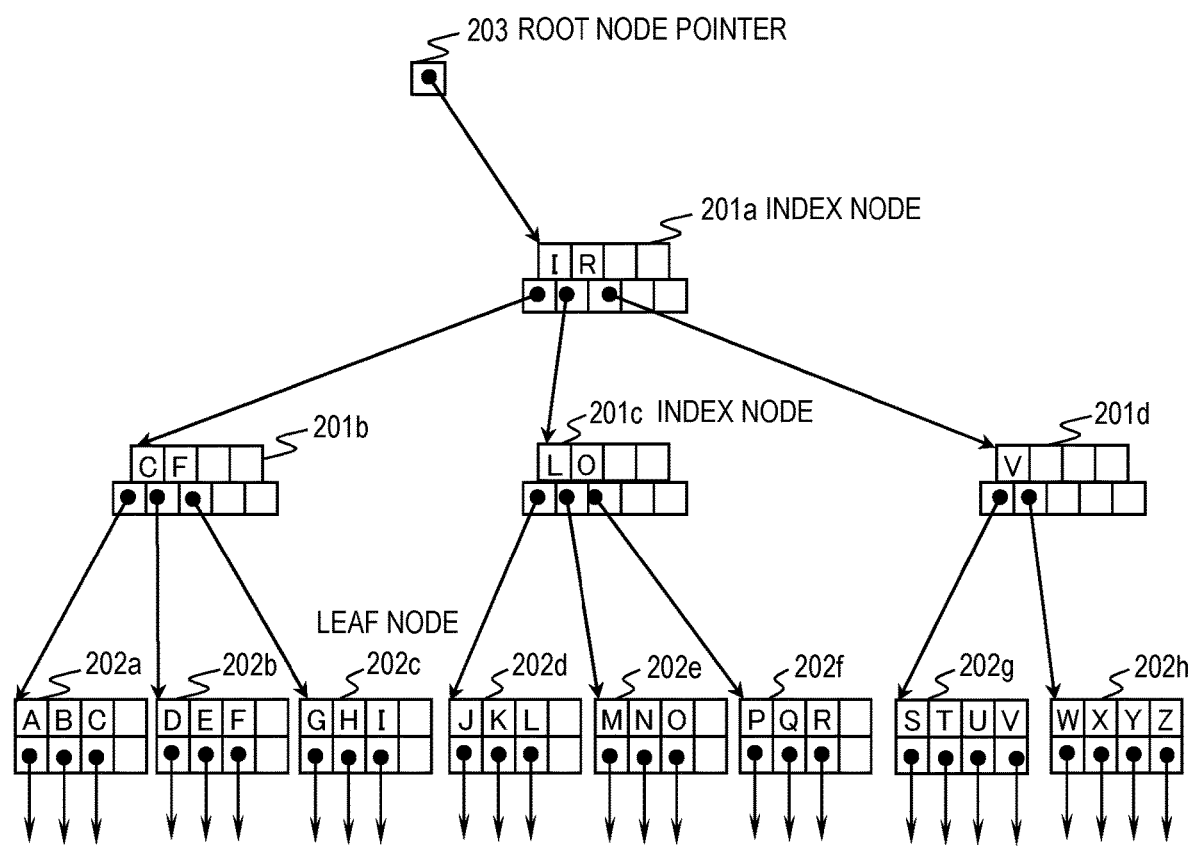
FIG. 2 is a schematic diagram depicting the embodiment of the present invention and an example of a logical configuration of an index.
Figure 3A:
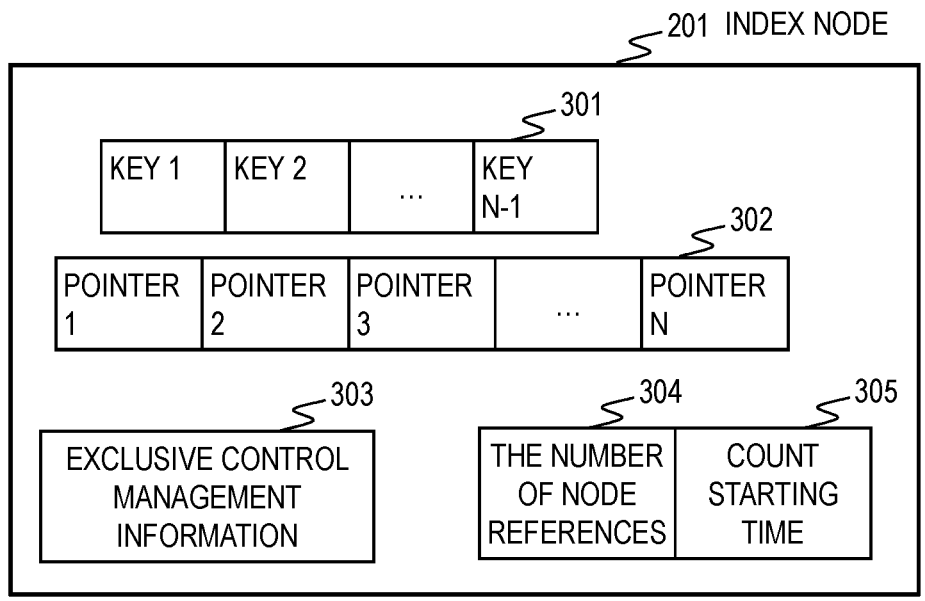
FIG. 3A is a block diagram depicting the embodiment of the present invention and an example of an inner structure of an index node.
Figure 3B:
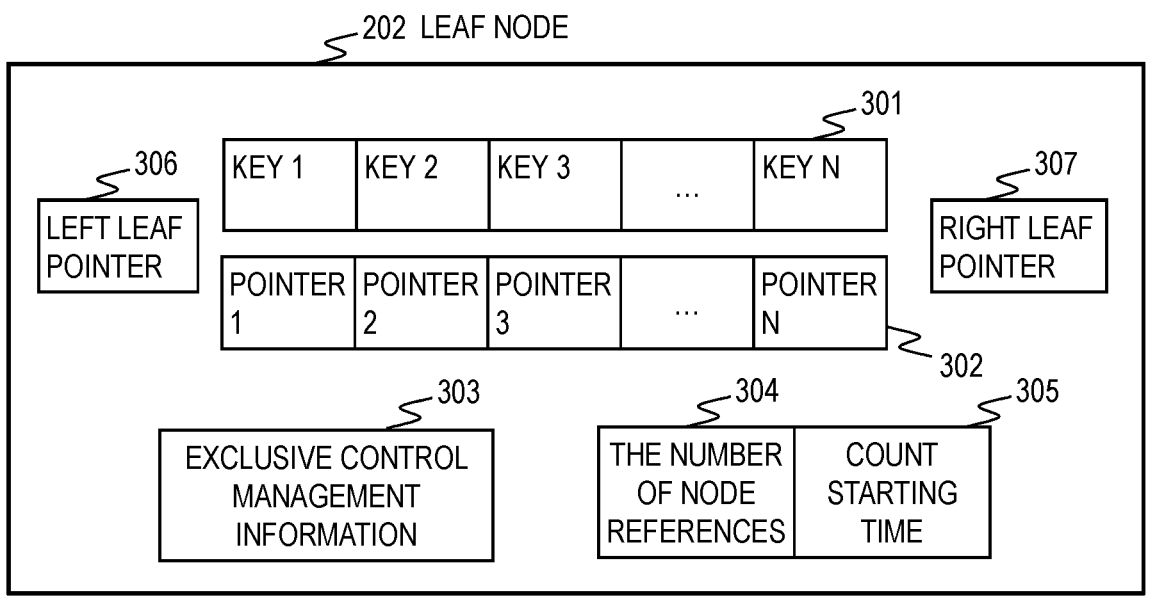
FIG. 3B is a block diagram depicting the embodiment of the present invention and an inner structure of a leaf node.
Figure 4:
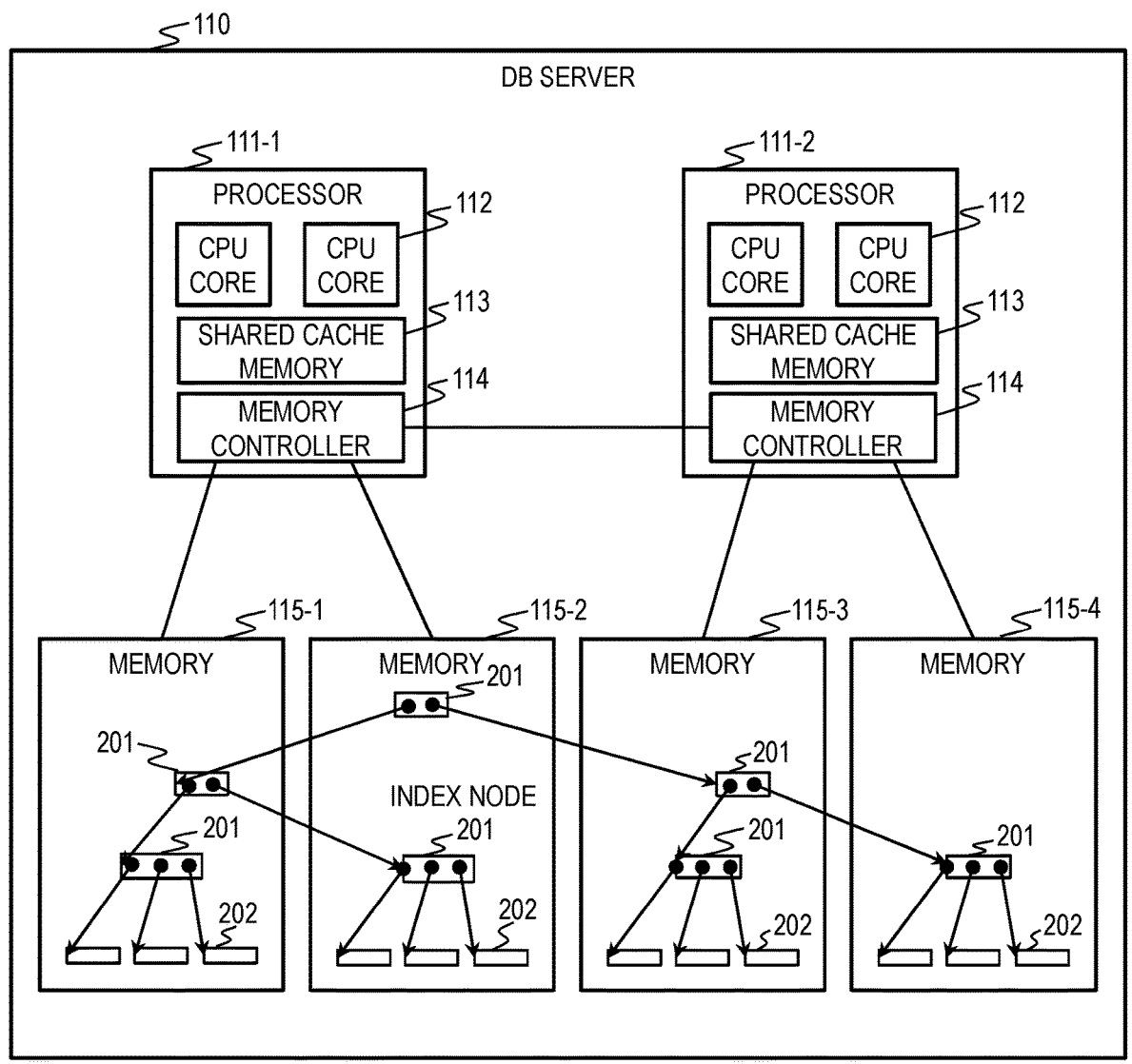
FIG. 4 is a block diagram depicting the embodiment of the present invention and an example of physical allocation of index nodes and leaf nodes on memories.

Next, a configuration of the index 128 is explained with FIGS. 2, 3, and 4.

FIG. 2 is a schematic diagram depicting a logical configuration of the index 128. An example of a B+ tree index generally used in DBMS is explained below.

B+ tree index is a data structure which has index nodes 201a to 201d and leaf nodes 202a to 202h connected with each other in a tree form by pointers. A reference numeral 201 is the generic reference numeral of the index nodes, and a reference numeral 202 is the generic reference numeral of the leaf nodes. A node is the generic name for the index node and the leaf node. The leaf node 202 stores a combination of index keys and pointers (filled circles in the diagram) to records of the table data 129. This combination is called an entry.

A node which is located at the top of the index tree is called a root node. A root node pointer 203 stores a pointer to the root node.

The index nodes 201 stores pointers (filled circles in the diagram) to lower-level index nodes 201 or leaf nodes 202. Index keys are stored between the pointers stored in the index node 201. As for any index key, a leaf node 202 pointed by a pointer located at the left side of the index key stores entries of index keys which are smaller than the index key. As for any index key, a leaf node 202 pointed by a pointer located at the right side of the index key stores entries of index keys which are greater than the index key.

Entry insertion, entry deletion, and entry lookup are typical operations for the index tree. Entry search processing, which searches the index tree from the root node based on a designated search key and determines a leaf node 202 and an entry of the leaf node 202 corresponding to the search key, is executed in each of the operations.

When a plurality of threads 402, at the same time, refer to or update the index tree, exclusive processing for nodes needs to be executed. For example, when change processing to the node, such as the entry insertion processing and the entry deletion processing, is executed, exclusive control prohibiting accesses to a node from the other threads needs to be executed. When the search processing is executed, the exclusive control prohibiting accesses to a node from the other threads needs to be executed in order to prevent other threads from changing the node referred.

One of the features of B+ tree index is that, as for any leaf node, the number of nodes traced from the root node to the leaf node 202 is fixed. In this embodiment, examples of processing are explained using B+ tree index below. However, the present invention can be applied to not only B+ tree index but also all tree structures having order relations (magnitude relations) between elements of their own.

FIG. 3A and FIG. 3B are diagrams depicting an example of the inner structure of the index node 201 and the leaf node 202 respectively. FIG. 3A is a block diagram depicting an example of the inner structure of the index node. FIG. 3B is a block diagram depicting the inner structure of the leaf node.

The Index node 201 includes N pointers 302 to lower-level nodes and N−1 index keys. When entry search based on a search key is executed, pointer X is traced if the search key is smaller than index key X (where X is 1 to N−1), pointer X+1 is traced if the search key is greater than index key X.

The index node 201 includes exclusive control management information 303. The exclusive control management information 303 is used for the exclusive control when the index node 201 is accessed by the plurality of threads at the same time. The exclusive control management information 303 is managed according to the exclusivity decision table 800 depicted in FIG. 8 and stores states of exclusive control of the index node.

In order to record a frequency of reference to the index node 201, the index node 201 includes the number of node references 304 and a count starting time 305 storing the time when the recording of the number of node references started.

The leaf node 202 of FIG. 3 includes N combinations of the index keys 301 and the pointers 302 to the records of the table data 129. As with the index node 201, the leaf node 202 includes the exclusive control management information 303, the number of node references 304, and the count starting time 305. The leaf node 202 additionally includes a pointer 306 to the left leaf node and a pointer 307 to the right leaf node.

The right leaf pointer 307 stores a pointer to a leaf node having greater values of index keys. The left leaf pointer 306 stores a pointer to a leaf node having smaller values of index keys.

FIG. 4 is a diagram depicting an example of physical allocation of the index nodes 201 and the leaf nodes 202 on the memories 115. When the DB server 110 includes the plurality of processors 111 and the plurality of memories 115 as shown in FIG. 4, the index nodes 201 and the leaf nodes 202 are dispersively allocated to the plurality of memories 115.

Neighboring leaf nodes 202 are allocated to the same memory 115 to the extent possible. An index node 201 whose all lower-level nodes are allocated to a same memory 115 may be allocated to the same memory 115. An index node 201 whose lower-level nodes are dispersively allocated to a plurality of memories 115 may be allocated to any memory 115.

When the index nodes 201 and the leaf nodes 202 are allocated to the plurality of memories 115 as described above, transparent accesses by the memory controllers 114 allow any CPU core 112 to access to any index node 201 and any leaf node 202.

FIG. 5 is a schematic diagram depicting processing by the SQL processing unit 121 and the index management unit 122 of this embodiment. When the SQL processing unit 121 receives a database processing request from the application program 151, the SQL processing unit 121 issues an index processing request 401 to the index management unit 122. The index processing request 401 is needed to process the database processing request.

The index processing request 401 includes a search key and an index control type, such as entry insertion and entry deletion. The index management unit 122 is executed by a plurality of threads 402, and includes a request queue 403 for each of the threads 402 to receive index control requests.

When the SQL processing unit 121 issues an index processing request 401, the SQL processing unit 121 refers to the after-mentioned thread allocating table 124 and determines the thread 402 corresponding to the search key included in the index processing request 401, and issues the index processing request 401 to the request queue 403 corresponding to the thread 402.

As shown in the diagrams, the DB server 110 includes two processors 111 including two CPU cores 112 respectively. In other words, the configuration of the DB server 110 is a two-socket server. The four CPU cores 112 can execute processing in parallel. An example that the SQL processing unit 121 includes four request queues 403 and issues four threads T1 to T4 is explained below.

FIG. 6 is an example of the thread allocating table 124 indicating a thread 402 to execute the index search processing for the search key when index tree searching is executed.

Each of the entries of the thread allocating table 124 includes thread 601 storing an identifier of a thread, search range 602 of the thread, and priority flag 605 indicating whether the thread is used prior to the other threads.

The search range 602 is indicated by left end key 603 and right end key 604 which are assigned to a corresponding thread. A search range of a thread may overlap with search ranges of other threads, and may not overlap with search ranges of all other threads. As for any search key, there is at least one thread having a search range including the search key.

Initial values of the left end key 603 and the right end key 604 of each thread in the thread allocating table 124 may be predetermined to equalize the number of leaf pages of the threads and the number of entries of the threads. The disposition of the nodes on the memories 115 depicted in FIG. 4 being considered, the initial values may be predetermined in accordance with a range of leaf nodes located on memories which are accessible locally by CPU cores 112 executing the thread.

When a search key is included in a plurality of search ranges of threads, the SQL processing unit 121 selects a thread whose priority flag 605 is "On" prior to the other threads, and issues an index processing request 401 to the request queue corresponding to the selected thread.

FIG. 6 depicts an example that search keys A to Z are assigned to threads T1 to T4. The left end key 603 of thread T1 in FIG. 6, "*", is the minimum value which is smaller than or equals to "F" which is the right end key 604 of thread T1. On the other hand, the right end key 604 of thread T4, "*", is the max value which is greater than "R" which is the left end key 603 of thread T4. The values which are greater than "F" and smaller than or equal to "L" are corresponding to the search range indicated by the left end key 603 and the right end key 604 of thread T2. The values which are greater than "L" and smaller than or equal to "R" are corresponding to the search range indicated by the left end key 603 and the right end key 604 of thread T3.

FIG. 17 is an example of a thread load recording table 130 managing a load of each of the threads T1 to T4. Each of the entries of the thread load recording table 130 includes thread 1701 storing an identifier of a thread, the number of times of index control 1702 storing the number of times of controlling the index by the thread, and count starting time 1703 storing the time when the counting of the number of times of index control 1702 started.

At the end of the search processing, the index management unit 122 updates the number of times of index control and records a load of each thread, or a load of each CPU core 112.

A load of a thread almost equals to a throughput of the thread. Therefore, in this embodiment, load of thread Ts may be computed using the following numerical expression.

$$\text{load} \approx \text{throughput} = \text{the number of times of index control}/(\text{current time} - \text{count starting time}) \quad (1)$$

Figure 7:
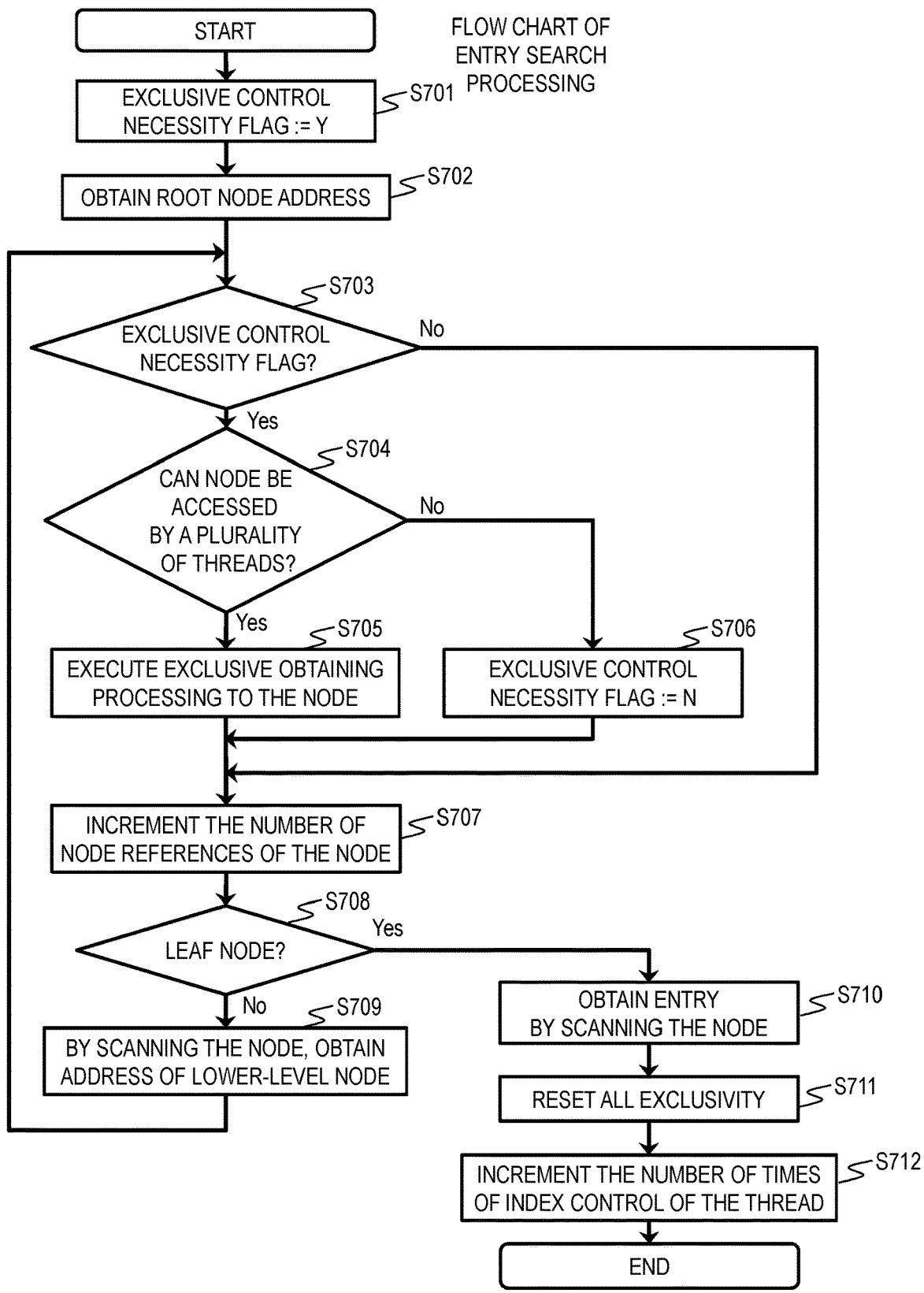
FIG. 7 is a flow chart depicting the embodiment of the present invention and entry search processing by the index management unit based on an index processing request.

FIG. 7 is a flow chart depicting an example of entry search processing by the index management unit 122 based on the index processing request 401. In the following explanation, thread Ts executes the entry search processing. This processing by the index management unit 122 is executed by CPU cores executing a thread selected in accordance with a search key.

The SQL processing unit 121 receives a database processing request including a search key (or a lookup key) before the search processing starts. The SQL processing unit 121 selects a thread 402 whose search range 602 includes the received search key by referring to the thread allocating table 124. The SQL processing unit 121 issues an index processing request 401 to a queue 403 corresponding to the selected thread 402.

The selected thread 402 obtains the index processing request 401 from the queue 403, and then the processing depicted in FIG. 7 starts.

First, the index management unit 122 initializes an exclusive control necessity flag (a variable) to "Y" (S701), and obtains an address of the index node 201 from the root node pointer 203 depicted in the FIG. 2 (S702).

Next, the index management unit 122 determines whether the exclusive control necessity flag is "Y" (S703). When the exclusive control necessity flag is "Y", the index management unit 122 determines whether the index node 201 or the leaf node (hereinafter referred to as the node) which is being searched can be accessed by a plurality of threads (S704). On the other hand, when the exclusive control necessity flag is "N" in step 703, the index management unit 122 proceeds to after-mentioned step 707.

The determination processing of step 704 is executed by determining whether there exists thread Tn (which is not the selected thread Ts) whose search range of K_Tn_min to K_Tn_max including K_N_min or K_N_max, where K_N_min is the minimum key of the node allocated to thread Ts, K_N_max is the max key of the node allocated to thread Ts, K_N_min is the minimum value of a search range of thread Tn, and K_N_min is the max value of the search range of thread Tn.

When the result of the determination in step 704 is "Yes", the index management unit 122 executes after-mentioned exclusive obtaining processing to the node (S705). On the other hand, when the result of the determination in step 704 is "No", the index management unit 122 sets "N" at the exclusive control necessity flag. Due to the processing, exclusive control to the node is prohibited when the result of the determination is "No".

Next, the index management unit 122 increments the number of node references 304 of the searched node (S707).

Next, the index management unit 122 determines whether the current searched node is a leaf node (S708). When the current searched node is an index node 201, the index management unit 122 obtains an address of a lower-level node by scanning the index keys in the index node 201 with the search key (S709), and the index management unit 122 recedes to S703.

When the current searched node is a leaf node, the index management unit 122 obtains an entry (a pointer 302) corresponding to the search key by scanning the index keys 301 in the leaf node 202 (S710), and executes processing in accordance with the index processing request 401.

Thereafter, the index management unit 122 resets the all exclusivity obtained by the thread in S705 (S711). The index management unit 122 increments the number of times of index control 1702 corresponding to the thread Ts in the thread load recording table 130 to manage the load of the thread Ts (S712). When the number of times of index control 1702 is the initial value "0", the current time is recorded in the count starting time 1703.

The determination of necessity of exclusive control to nodes allocated to the threads T1 to T4 by the index management unit 122 in the above step S704 allows only nodes which are accessible by a plurality of threads to be exclusive control targets and allows nodes which are accessible by only one node not to require the exclusive control targets.

By the determination whether the exclusive control necessity flag is "Y" in step S703, once it is determined that the exclusive control to a node is unnecessary, the determination processing of necessity of the exclusive control in step S704 for the lower-level nodes is unnecessary.

As stated above, by not executing (prohibiting) the exclusive control to nodes which are not accessible at the same time, the number of times of executing the exclusive control can be reduced. The number of threads accessing to nodes requiring the exclusive control is reduced by search ranges allocation to threads, therefore a frequency of conflict in the exclusive control can be reduced. Further, when it is determined that the exclusive control to a node is unnecessary in step 703, the determination processing of necessity of the exclusive control in step S704 for the lower-level node can be prohibited, and the prohibiting of the exclusive control enables the processing to speed up.

FIG. 8 is an example of the exclusivity decision table 800 used in the exclusive obtaining processing described in the above step S705 in the FIG. 7.

The exclusivity decision table 800 describes processing in the case that a thread (hereinafter referred to as the succeeding thread) attempts to obtain exclusivity (805) on an exclusivity type that other thread (hereinafter referred to as the preceding thread) has already obtained (801).

The exclusivity types include "reference exclusivity" and "update exclusivity". When keys or pointers of a node are only referred, "reference exclusivity" needs to be obtained. When keys or pointers of a node are changed, "update exclusivity" needs to be obtained. States of exclusive control and the exclusive types of the nodes are stored in the exclusive control management information 303.

When the succeeding thread attempts to obtain the reference exclusivity (806), the succeeding thread can obtain the reference exclusivity immediately when there is not any preceding thread having already obtained exclusivity (802) or the preceding threads have obtained the reference exclusivity (803). When the preceding thread has obtained the update exclusivity (804), the succeeding thread is in a wait state until the preceding thread resets the exclusivity.

When the succeeding thread attempts to obtain the update exclusivity and there is not any preceding thread having already obtained exclusivity, the succeeding thread can obtain the update exclusivity immediately. When a preceding thread has already obtained the reference exclusivity or the update exclusivity for the node, the succeeding thread is in a wait state until the preceding thread resets the exclusivity.

The above processing with the reference exclusivity allows a plurality of threads to execute operations without changing index keys 301 and pointers 302 of nodes at the same time.

The above example describes the exclusive processing using two types of exclusivity, the reference exclusivity and the update exclusivity, but advanced locking processing method, such as multiple granularity locking, may be used.

Figure 9:
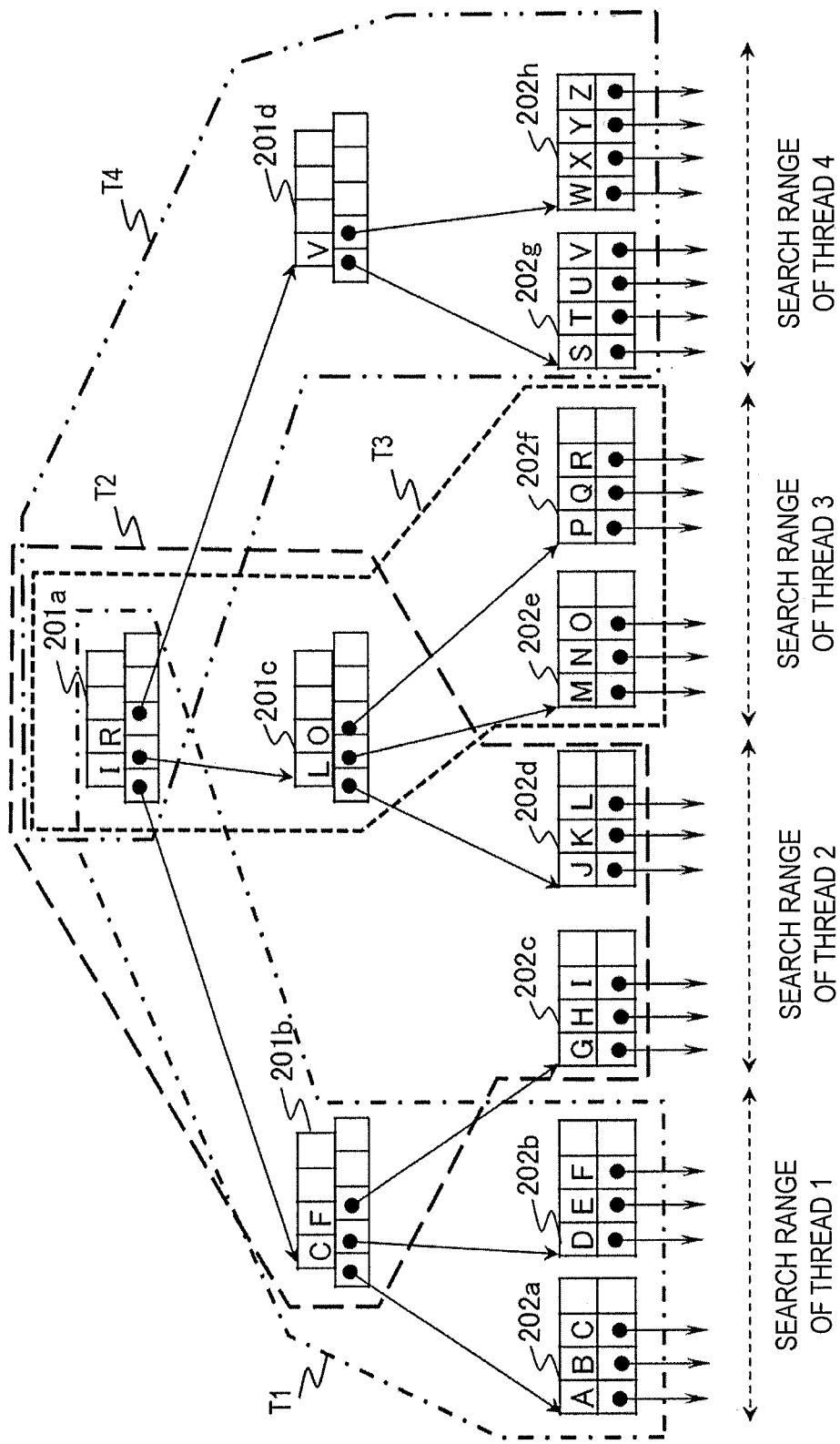
FIG. 9 is a diagram depicting the embodiment of the present invention and an example of effect of reducing the number of times of exclusive control processing.

FIG. 9 is a diagram depicting an example of effect of reducing the number of times of exclusive control processing by the present invention. In the index tree of FIG. 9, ranges of nodes which are accessible by threads T1 to T4 respectively based on the thread allocating table depicted in FIG. 6 are depicted with dashed lines.

For example, it is shown that the index node 201*d* does not have a possibility to be accessed by threads T1 to T3, and is accessed by only thread T4. Therefore, exclusive control processing in accessing to the index node 201*d* is unnecessary.

For the other index nodes 201*b* and 201*c* as well, a possibility of occurrences of conflict (the wait state for reset the exclusivity in FIG. 8) in exclusive control is reduced due to the reduction of the number of threads which are accessible to the index nodes.

To improve cache hit ratio of the shared cache memory 113 in the processor 111 can be expected by limiting ranges of accessible node from the threads and prevent the threads from accessing to freely-selected nodes.

Next, an example of load balancing processing when an imbalance in loads of the threads occurs is explained using FIG. 10 to FIG. 17.

When the processing requests concentrate at certain index keys (or nodes), the imbalance in the loads of the threads occurs, and a throughput of the whole DBMS 120 is reduced. Therefore, the loads of the threads need to be balanced by transferring the loads between threads T1 to T4.

Figure 10:
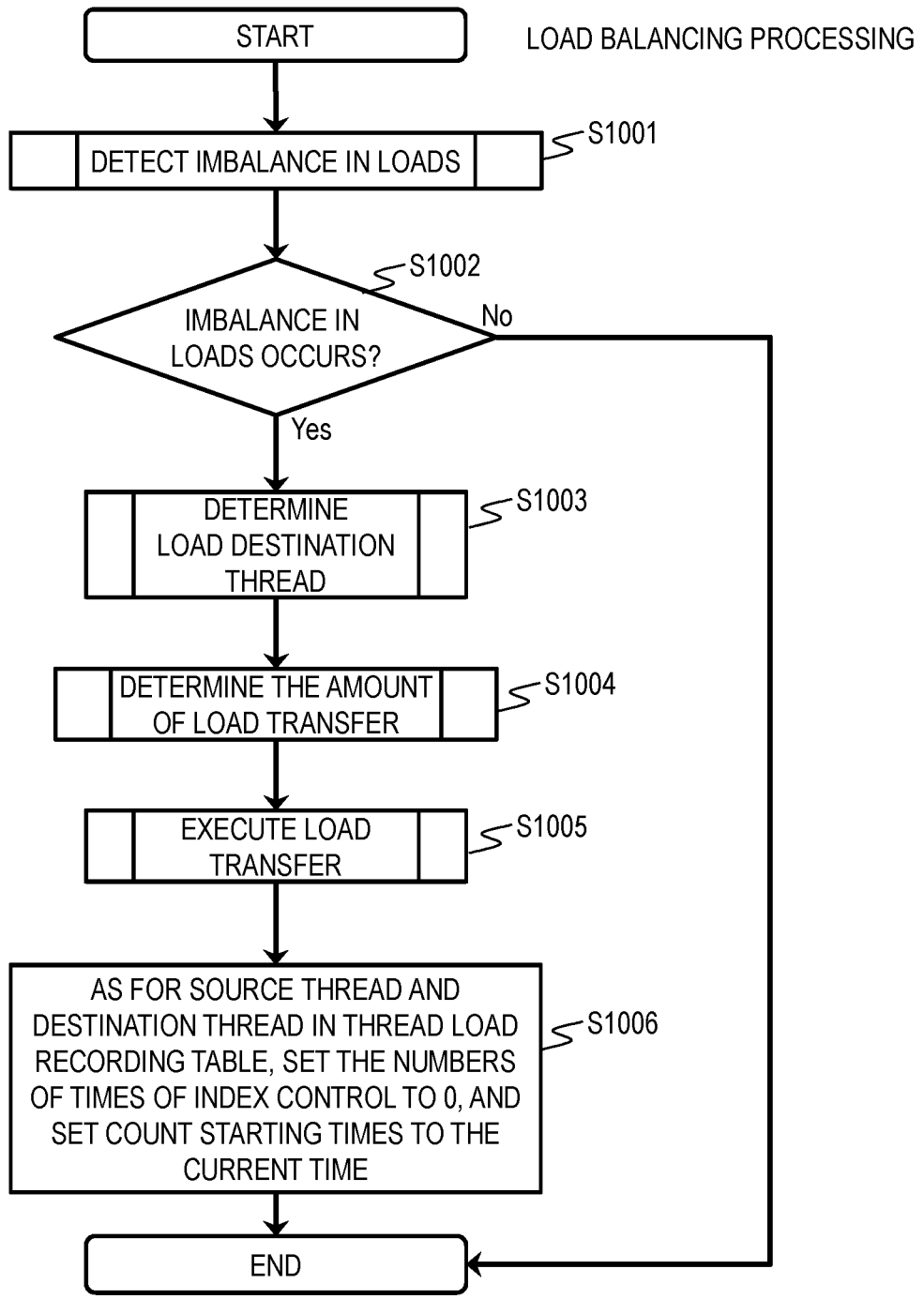
FIG. 10 is a flow chart depicting the embodiment of the present invention and whole load balancing processing.

FIG. 10 is a flow chart depicting whole load balancing processing by the load balancing management unit 125. First, the load balancing management unit 125 executes processing detecting an imbalance in loads (throughputs) of threads T1 to T4 (S1001) and determines whether the imbalance occurs (S1002). When the imbalance in threads T1 to T4 occurs, the load balancing management unit 125 executes processing which determines a load destination thread (S1003) and processing which computes the amount of load transfer (S1004), and executes transferring the load based on the result (S1005). As for a source thread and the destination thread in the thread load recording table 130, the load balancing management unit 125 resets the numbers of times of index control by setting them to 0, and resets the count starting times by setting them to the current time (S1006). Details of steps S1001 and S1003 to S1005 are explained with FIG. 12 or later.

The load balancing processing may be executed at any time, for example, may be executed at regular intervals and may be executed each time when the predetermined number of index control requests is executed. The load balancing processing may be executed by any thread 402 and may be executed by threads specialized in the load balancing processing. One of the threads T1 to T4 executes the load balancing processing in the following explanation.

Figures 11, 12:
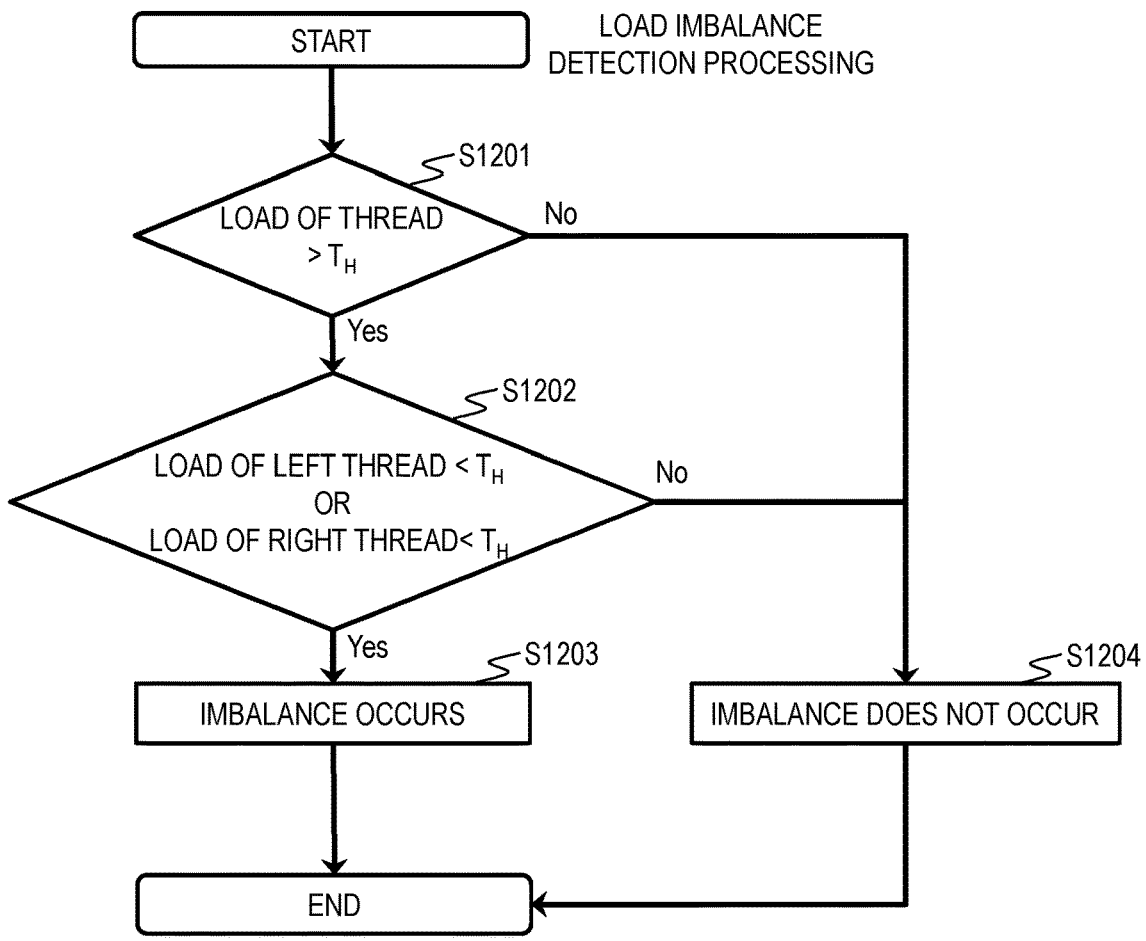
FIG. 11 is an example of a load balancing parameter table depicting the embodiment of the present invention.
FIG. 12 is a flow chart depicting the embodiment of the present invention and load imbalance detection processing.

FIG. 11 is an example of the load balancing parameter table 126 in which parameters used in the load balancing processing are stored.

Each entries of the load balancing parameter table 126 includes imbalance detecting threshold 1101, which is threshold $T_H$ to detect the occurrence of load imbalance, and a low load determination threshold 1102, which is threshold $T_L$ used in selecting a load destination. These thresholds and after-mentioned loads are throughput values, such as the number of index control requests per unit time. In the below explanation, a set value of the imbalance detecting threshold 1101 is $T_H$, and a set value of the low load determination threshold 1102 is $T_L$. The load balancing parameter table 126 is referred by the load balancing management unit 125.

FIG. 12 is a flow chart depicting details of the load imbalance detection processing of S1001 in FIG. 10.

First, the load balancing management unit 125 obtains the number of times of index control 1702 and the count starting time 1703 of a first thread, which is one of threads T1 to T4, by referring to the thread load recording table 130 and computes a load using the above numerical expression (1).

The load balancing management unit 125 determines whether the load of the first thread is greater than imbalance detecting threshold $T_H$ (S1201). When the load of the thread is greater than imbalance detecting threshold $T_H$, the load balancing management unit 125 determines whether a load of a thread having a search range including index keys on the left side of the first thread (hereinafter referred as the left thread) or a load of a thread having a search range including index keys on the right side of the first thread (hereinafter referred as the right thread) is greater than imbalance detecting threshold $T_H$ (S1202). In FIG. 9, when the first thread is thread T2, the left thread is thread T1 including the index keys A to F and the left thread's identifier is smaller than the first thread's identifier. The right thread is thread T3 including the index keys M to R and the right thread's identifier is greater than the first thread's identifier The load balancing management unit 125 obtains the numbers of times of index control 1702 and the count starting times 1703 of the left thread and the right thread by referring to the thread load recording table 130, and computes loads of the left thread and a load of the right thread using the above numerical expression (1).

Next, when at least one of the load of the left thread and the load of the right thread is greater than imbalance detecting threshold $T_H$, the load balancing management unit 125 determines that a load imbalance occurs, and finishes the load imbalance detection processing (S1203). On the other hand, when the result of the determination of step S1201 or step S1202 is No, the load balancing management unit 125 determines that the load imbalance does not occur, and finishes the load imbalance detection processing (S1204).

By the above processing, when the load of the first thread is greater than threshold $T_H$ and at least one of the loads of the left thread and the right thread is smaller than threshold $T_H$, the occurrence of the load imbalance can be detected.

FIG. 13 is an example of the thread-core association table 127 used in the load destination determination processing of S1003 in FIG. 10. The thread-core association table 127 manages the threads and manages which processor 111 or CPU core 112 executes the threads.

Each of the entries of the thread-core association table 127 includes thread ID (1301), processor ID (1302) of a processor executing the thread, and CPU core ID (1303) of a CPU core executing the thread.

The load balancing management unit 125 can determine whether a processing target thread and other threads are executed by the same processor by referring to the thread-core association table 127.

FIG. 14A and FIG. 14B are examples of transfer direction determination tables 1400 and 1410 used in S1003 of load destination determination processing in FIG. 10

In the load destination determination processing of S1003, as shown in FIG. 14A, the load balancing management unit 125 compares the load of the left thread (1401) with imbalance detecting threshold $T_H$ and low load determination threshold $T_L$, compares the load of the right thread (1402) with imbalance detecting threshold $T_H$ and low load determination threshold $T_L$, and determines that transferring in a direction indicated by a cell in the transfer direction determination table 1400 corresponding to the comparison result is executed.

When the load of the left thread 1401 and the load of the right thread 1402 are smaller than low load determination threshold $T_L$ or the both loads are included in the range from low load determination threshold $T_L$ to imbalance detecting threshold $T_H$, the load balancing management unit 125 determines the transfer direction using the transfer direction determination table 1410 of FIG. 14B.

In the processing using the transfer direction determination tables of FIG. 14, a load destination thread is determined by determining whether each of the identifiers of processors executing the left thread and the right thread is the same as an identifier of a processor executing a source thread.

The determination of the destination thread based on only FIG. 14A means that the thread whose load is lower is selected as the destination thread due to the large difference between the loads of the left thread and the right thread.

On the other hand, the determination of the destination thread based on FIG. 14B means that it takes priority to execute the load transfer in the same processor 111 to the extent possible taking into account physical allocation on the memories 115, because the small difference between the loads of the left thread and the right thread.

Thus, the load balancing management unit 125 can determine a destination thread to which a load (index keys) is transferred from a thread based on the loads of the left thread and the right thread. As shown in FIG. 9, there exists no left destination thread for thread T1 including the minimum value of the index keys 301, and there exists no right destination thread for thread T4 including the max value of the index keys 301.

Figure 15:
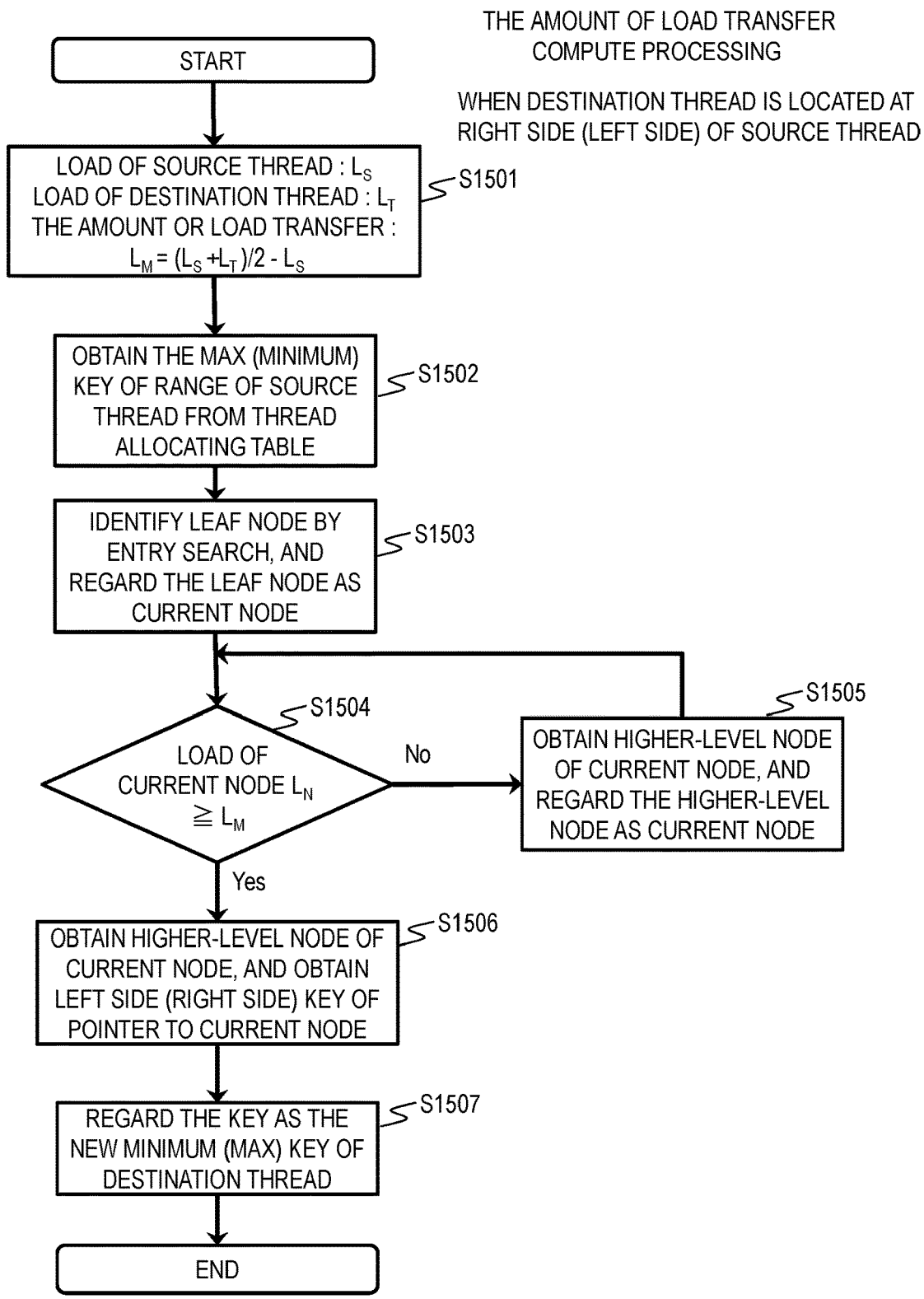
FIG. 15 is a flow chart depicting the embodiment of the present invention and the amount of load transfer compute processing.

FIG. 15 is a flow chart depicting an example of the amount of load transfer compute processing of S1004 in FIG. 10. In the amount of load transfer compute processing of S1004, a search range of index keys newly allocated to the destination thread determined in the load destination determination processing of S1003 is computed. In the below explanation, the load destination thread is the right thread. When the load destination thread is the left thread, the descriptions in the pairs of parentheses in FIG. 15, (minimum), (right end), and (max), are used. The load amount which should be transferred $L_M$ is a search range of index keys 301 newly allocated to the destination thread from the current thread.

First, the load balancing management unit 125 computes amount of load transfer $L_M$ (S1501). In this embodiment, the amount of load transfer $L_M$ may be computed using the following numerical expression, $$L_M = (L_S + L_T)/2 - L_S \qquad (2),$$

where $L_S$ is the load of the source thread, $L_T$ is the load of the destination thread.

Next, the load balancing management unit 125 obtains the right end key 604 of the source thread from the thread allocating table 124 (S1502). The load balancing management unit 125 identifies a leaf node 202 by executing entry search processing with the key and determines that the leaf node is the current node (S1503).

The load balancing management unit 125 compares load of the current node $L_N$ with amount of load of the current node $L_M$ (S1504), when load of the current node $L_N$ is smaller, determines that the higher-level node of the current node is a new current node and recedes to S1504 (S1505).

On the other hand, when load of the current node $L_N$ is greater than amount of load of the current node $L_M$, the higher-level node of the current node is obtained and a key located at left side of the pointer to the current node is obtained (S1506). It is determined that the key obtained in S1506 is a new left end key of the destination thread (S1507).

The above processing enables the load balancing management unit 125 to collectively transfer entries of lower-level nodes of a node as the load amount from a thread to the right thread (or the left thread) and to execute the load balancing processing fast. Further, a possibility that the index node is accessed by a plurality of threads can be reduced by the load balancing management unit 125 changing the allocation in the threads on an index node basis.

The above explanation shows an example that amount of load transfer $L_M$ is transferred to the right thread. However, amount of load transfer $L_M$ may be transferred to the left thread by the processing based on the descriptions in the pairs of parentheses in FIG. 15.

Figure 16:
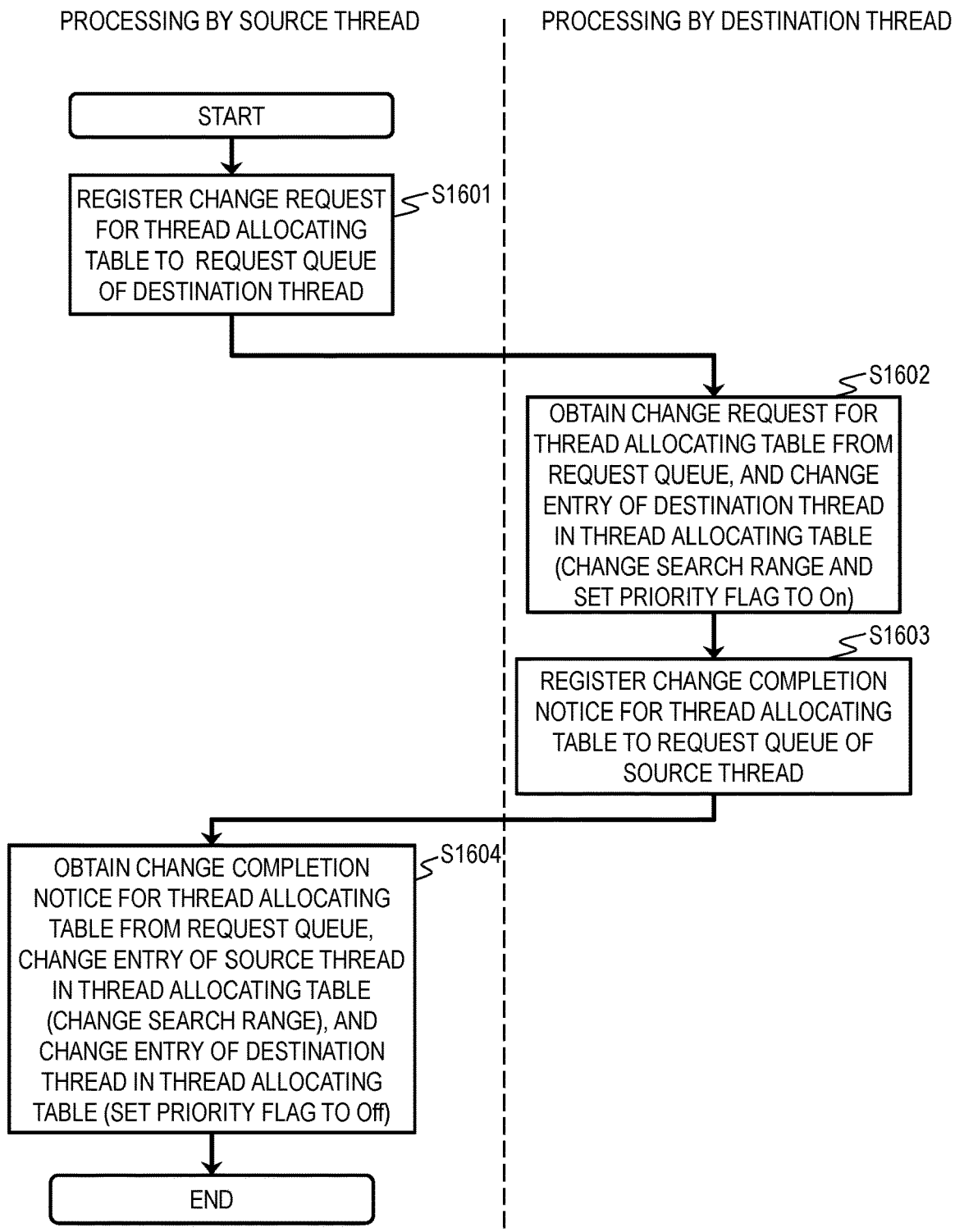
FIG. 16 is a flow chart depicting the embodiment of the present invention and load transferring processing.

FIG. 16 is a flow chart depicting an example of the load transferring processing of S1005 in FIG. 10. In FIG. 16, Processing by the source thread is depicted at the left side of the dashed line and Processing by the destination thread is depicted at the right side of the dashed line.

First, the source thread registers a change request for the thread allocating table 124 to a request queue 403 corresponding to the destination thread (S1601).

The destination thread obtains the change request for the thread allocating table 124 from the request queue 403, and then changes left end key 603 of the destination thread in the thread allocating table 124 to a left end key determined in the amount of load transfer compute processing of S1004. The destination thread changes priority flag 605 corresponding to thread 601 corresponding to the destination thread to "On" (S1602). Thereafter, the destination thread registers change completion notice for the thread allocating table 124 to a request queue 403 corresponding to the source thread (S1603).

The source thread obtains the change completion notice for the thread allocating table 124 from the request queue 403, and then changes right end key 604 of the source thread in the thread allocating table 124 to the left end key determined in the amount of load transfer determination processing of S1004. The source thread changes priority flag 605 corresponding to the destination thread to "Off" (S1604).

During steps S1604 to S1604, the above load transfer processing enables the source thread to process the index control request and to change the search range of each of the threads without suspending processing.

By the above load balancing processing, when the imbalance in loads of the threads occurs, the loads can be balanced with the small amount of processing. Moreover, the loads are transferred between the threads by changing the allocation of the search ranges of the threads, therefore the loads can be balanced without changing the index tree structure. Therefore, the load transfer processing can be executed at high speed and with low load.

The above embodiment shows an example of the in-memory database storing the indexes 128 and the table data 129 in the memories 115 but the above embodiment can be applied to an on-disk database. In the case of the on-disk database, by providing a DB cache for each thread on the disks not depicted in the FIGS. instead of the indexes 128 in the memories 115, and the indexes can be allocated to these DB caches.

The above embodiment shows an example that one CPU core 112 in the processor 111 executes one thread but not limited to the example. One physical CPU core may provide a plurality of logical CPU cores and the one logical CPU core may execute one thread.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration. The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device, such as a memory, a hard disk drive, or an SSD (Solid State Drive), or a storage medium, such as an IC card, or an SD card.

The drawings shows control lines and information lines as considered necessary for explanations but do not show all control lines or information lines in the products. It can be considered that almost of all components are actually interconnected.

All or part of the configurations, the processing units, the processing means, and the like of the computers explained in this invention may be achieved by specialized hardware.

A variety of software exemplified in the embodiments can be stored in a variety of a storage medium, such as an electromagnetic, an electric, and an optical storage medium, and can be downloaded into a computer through a network, such as Internet.

<Supplementation>

16. The computer according to claim 14, wherein the index management unit records, upon referring to or updating a node included in the index tree, a number of times of using the node as an amount of load of the node, wherein the index management unit determines an amount of load which is transferred to equalize an amount of load of the source thread with an amount of load of the destination thread, wherein the index management unit repeats, each of nodes from a lowest-level node to higher-level nodes, a determining step whether an amount of load of each of the node is greater than a predetermined threshold until a result of the determination is true, and wherein the index management unit determines that a node whose result of the determining step is true is included in a new search range of the destination thread.

17. The computer according to claim 14, wherein the source thread requests to the destination thread to change a search range of the destination thread, wherein the destination thread changes the search range of the destination thread, wherein the destination thread notices completion of changing the search range to the source thread, and wherein the source thread changes a search range of the source thread.

18. The computer according to claim 11, wherein the index management unit divides the index tree into the plurality of search ranges and allocates max values and minimum values of the plurality of search ranges divided to the threads

What is claimed is:

1. An index tree search method, by a computer, for searching an index tree included in a database provided by the computer which includes processors executing a plurality of threads and a memory, the index tree search method comprising:

a first step of allocating, by the computer, search ranges in the index tree to the plurality of threads;

a second step of receiving, by the computer, a search key;

a third step of selecting, by the computer, a thread corresponding to the received search key; and a fourth step of searching, by the computer, the index tree with the selected thread using the received search key;

wherein the fourth step includes:

a step of determining, upon referring to or updating a node included in the index tree, whether the node is referred to or updated by a plurality of threads;

a step of executing exclusive control to the node when a result of the determination is true;

a step of prohibiting the exclusive control to the node when the result of the determination is false because the node is referred to or updated by only one of the threads; and a step of prohibiting the exclusive control to the node when the result of the determination is false because the node is referred to or updated by none of the threads.

2. The index tree search method according to claim 1, wherein the first step divides the index tree into a plurality of search ranges and allocates the plurality of search ranges to the threads.

3. The index tree search method according to claim 2, wherein the first step divides the index tree into the plurality of search ranges and allocates max values and minimum values of the plurality of search ranges divided to the threads.

4. The index tree search method according to claim 1, wherein the fourth step prohibits the determination about reference or update for a lower-level node of the node when the result of the determination is false, and prohibits the exclusive control to the lower-level node.

5. The index tree search method according to claim 1, further comprising:

a fifth step of detecting, by the computer, loads of the plurality of threads and an imbalance in the loads of the plurality of threads;

a sixth step of determining, by the computer, a destination thread to which a load is transferred from a source thread when the computer detects the imbalance of the loads in the plurality of threads;

a seventh step of determining, by the computer, an amount of transferring the load; and an eighth step of transferring, by the computer, the determined amount of load from the source thread to the destination thread.

6. The index tree search method according to claim 5, wherein the fourth step includes a step of recording, upon referring to or updating a node included in the index tree, a number of times of using the node as an amount of load of the node, and wherein the seventh step includes:

a step of determining an amount of load which is transferred to equalize an amount of load of the source thread with an amount of load of the destination thread;

a step of repeating, for each of nodes from a lowest-level node to higher-level nodes, a determining step whether an amount of load of each of the node is greater than a predetermined threshold until a result of the determination is true; and a step of determining that a node whose result of the determining step is true is included in a new search range of the destination thread.

7. The index tree search method according to claim 5, wherein the eighth step includes:

a step of requesting, by the source thread, to the destination thread to change a search range of the destination thread;

a step of changing, by the destination thread, the search range of the destination thread;

a step of notifying, by the destination thread, the source thread of completion of changing the search range;

a step of changing, by the source thread, a search range of the source thread.

8. The index tree search method according to claim 1, wherein the result of the determination is false because the node is referred to or updated by only one of the threads and the exclusive control to the node is prohibited.

9. The index tree search method according to claim 1, wherein the fourth step prohibits the determination about reference or update for a lower-level node of the node when the result of the determination is false because the node is referred to or updated by only one of the threads, and prohibits the exclusive control to the lower-level node.

10. An index tree search method, by a computer, for searching an index tree included in a database provided by the computer which includes processors executing a plurality of threads and a memory, the index tree search method comprising:

a first step of allocating, by the computer, search ranges in the index tree to the plurality of threads;

a second step of receiving, by the computer, a search key;

a third step of selecting, by the computer, a thread corresponding to the received search key; and a fourth step of searching, by the computer, the index tree with the selected thread using the received search key;

wherein the fourth step includes:

a step of determining, upon referring to or updating a node included in the index tree, whether the node is referred to or updated by a plurality of threads;

a step of executing exclusive control to the node when a result of the determination is true;

a step of prohibiting the exclusive control to the node when the result of the determination is false because the node is referred to or updated by only one of the threads; and a step of prohibiting the exclusive control to the node when the result of the determination is false because the node is referred to or updated by none of the threads;

a fifth step of detecting, by the computer, loads of the plurality of threads and an imbalance in the loads of the plurality of threads;

a sixth step of determining, by the computer, a destination thread to which a load is transferred from a source thread when the computer detects the imbalance of the loads in the plurality of threads;

a seventh step of determining, by the computer, an amount of transferring the load; and an eighth step of transferring, by the computer, the determined amount of load from the source thread to the destination thread;

wherein the sixth step selects a thread, prior to the other threads, which is executed by a processor executing the source thread.

11. A computer which includes processors executing a plurality of threads and a memory, for searching an index tree included in a database, the computer comprising:

an index management unit which allocates search ranges in the index tree to the plurality of threads; and a request processing unit which receives a search key and selects a thread corresponding to the received search key;

wherein the index management unit searches the index tree with the selected thread using the received search key;

wherein the index management unit determines, upon referring to or updating a node included in the index tree, whether the node is referred to or updated by a plurality of threads, wherein the index management unit executes exclusive control to the node when a result of the determination is true, wherein the index management unit prohibits the exclusive control to the node when the result of the determination is false because the node is referred to or updated by only one of the threads, and wherein the index management unit prohibits the exclusive control to the node when the result of the determination is false because the node is referred to or updated by none of the threads.

12. The computer according to claim 11, wherein the index management unit divides the index tree into a plurality of search ranges and allocates the plurality of search ranges to the threads.

13. The computer according to claim 12, wherein the index management unit divides the index tree into the plurality of search ranges and allocates max values and minimum values of the plurality of search ranges divided to the threads.

14. The computer according to claim 11, wherein the index management unit prohibits the determination about reference or update for a lower-level node of the node when the result of the determination is false, and prohibits the exclusive control to the lower-level node.

15. The computer according to claim 11, wherein the index management unit detects loads of the plurality of threads and an imbalance in the loads of the plurality of threads, wherein the index management unit determines a destination thread to which a load is transferred from a source thread when the index management part detects the imbalance of the loads in the plurality of threads, wherein the index management unit determines an amount of transferring the load, and wherein the index management unit transfers the determined amount of load from the source thread to the destination thread.

16. The computer according to claim 15, wherein the index management unit selects a thread, prior to the other threads, which is executed by a processor executing the source thread.

17. The computer according to claim 15, wherein the index management unit records, upon referring to or updating a node included in the index tree, a number of times of using the node as an amount of load of the node;

wherein the index management unit determines an amount of load which is transferred to equalize an amount of load of the source thread with an amount of load of the destination thread;

wherein the index management unit repeats, for each of nodes from a lowest-level node to higher-level nodes, a determining step whether an amount of load of each of the node is greater than a predetermined threshold until a result of the determination is true; and wherein the index management unit determines that a node whose result of the determining step is true is included in a new search range of the destination thread.

18. The computer according to claim 15, wherein the index management unit requests, by the source thread, to the destination thread to change a search range of the destination thread;

wherein the index management unit changes, by the destination thread, the search range of the destination thread;

wherein the index management unit notifies, by the destination thread, the source thread of completion of changing the search range; and wherein the index management unit changes, by the source thread, a search range of the source thread.

19. The computer according to claim 11, wherein the result of the determination is false because the node is referred to or updated by only one of the threads and the index management unit prohibits the exclusive control to the node.

20. The computer according to claim 11, wherein the index management unit prohibits the determination about reference or update for a lower-level node of the node when the result of the determination is false because the node is referred to or updated by only one of the threads, and prohibits the exclusive control to the lower-level node.

* * * * *